United States Patent [19]

Eckels

[11] 4,250,418
[45] Feb. 10, 1981

[54] SUPERCONDUCTING GENERATOR AND METHOD
[75] Inventor: Phillip W. Eckels, Pittsburgh, Pa.
[73] Assignee: Electric Power Research Institute, Inc., Palo Alto, Calif.
[21] Appl. No.: 905,041
[22] Filed: May 11, 1978
[51] Int. Cl.³ .............................................. H02K 1/32
[52] U.S. Cl. ...................................... 310/64; 310/261
[58] Field of Search ...................... 310/10, 64, 40, 52, 310/261, 265; 336/DIG. 1

[56] References Cited
U.S. PATENT DOCUMENTS

| 3,942,053 | 3/1976 | Abolins | 310/10 |
| 3,999,091 | 12/1976 | Kirtley | 310/52 |
| 4,076,988 | 2/1978 | Litz | 310/10 |
| 4,092,555 | 5/1978 | Ying | 310/52 |
| 4,117,357 | 9/1978 | Baumann | 310/261 |
| 4,123,676 | 10/1978 | Cooper | 310/52 |

Primary Examiner—R. Skudy
Attorney, Agent, or Firm—Flehr, Hohbach, Test, Albritton & Herbert

[57] ABSTRACT

A superconducting generator is disclosed herein and includes a super cooled rotor assembly and two interconnected torque tubes constructed of a material having a thermal coefficient of linear expansion which is negligible at and below a predetermined cryogenic temperature. During normal operation of the generator, predetermined axial sections of these torque tubes are maintained at or below this cryogenic temperature. This minimizes thermal expansion of these sections and eliminates damage therefrom should the generator operate in an abnormal way which causes the torque tube sections to drop significantly in temperature. At the same time, other axial sections of the torque tubes are maintained at temperatures above this cryogenic temperature during normal operation of the generator but are coupled to an external source of heat to minimize any drop in temperature of these sections during abnormal operation.

2 Claims, 5 Drawing Figures

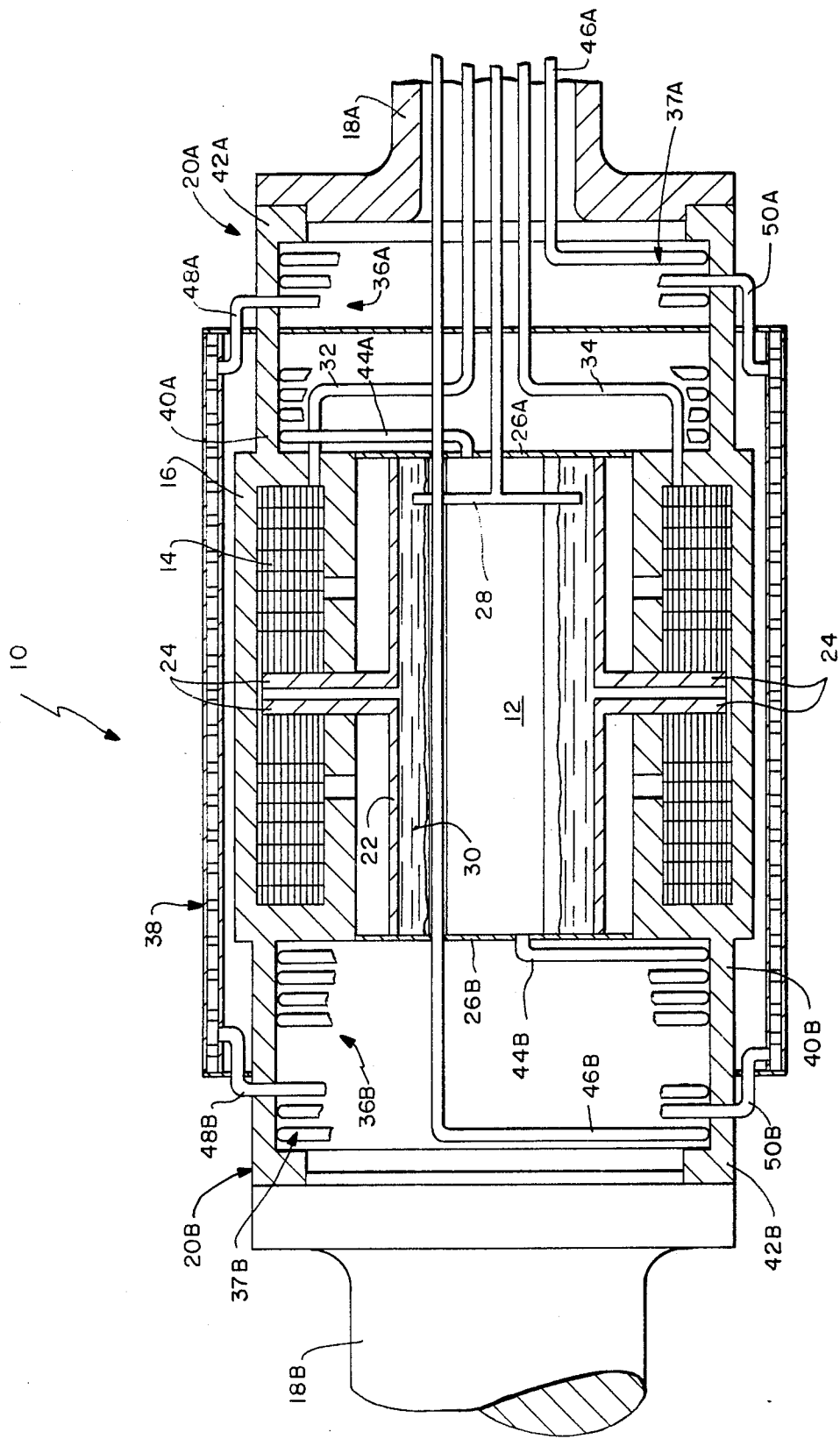
FIG.—1

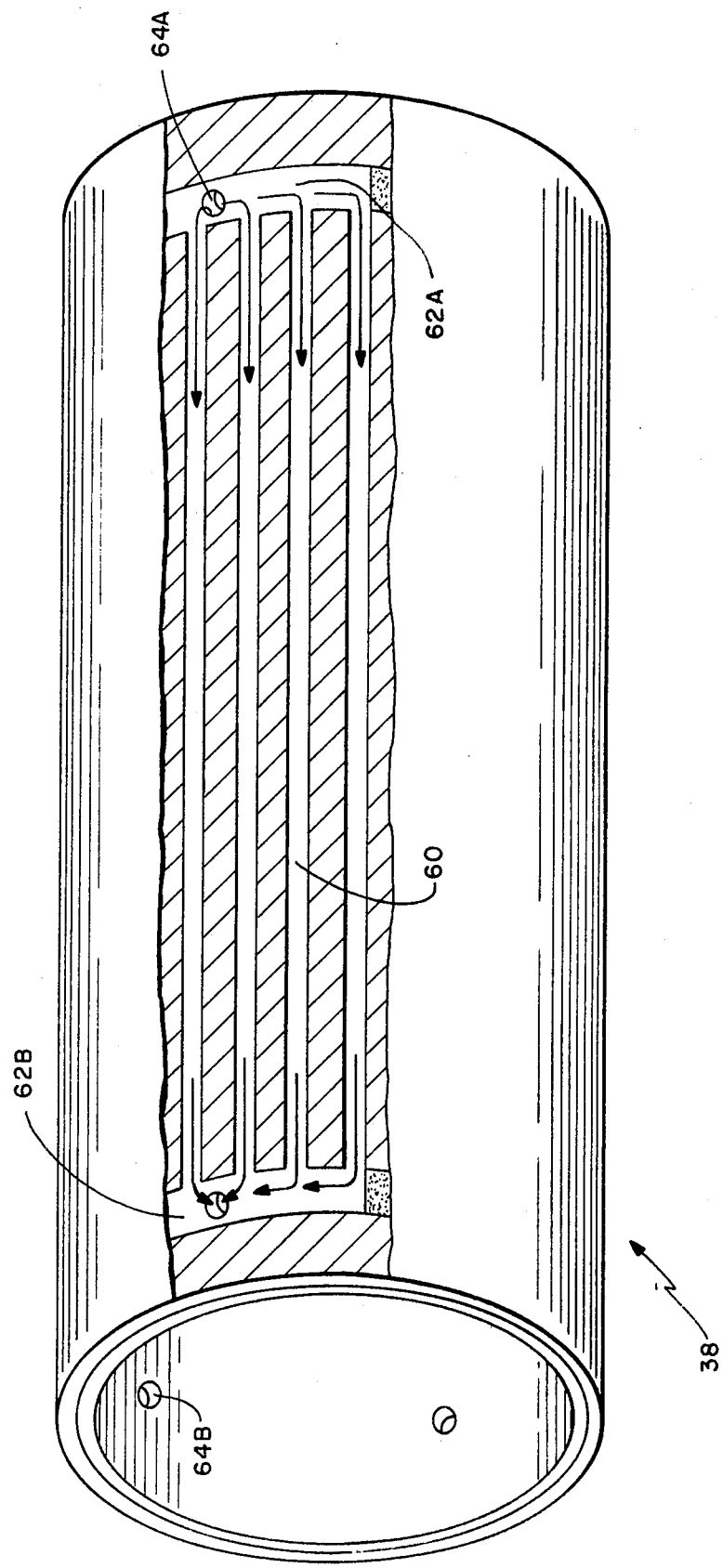

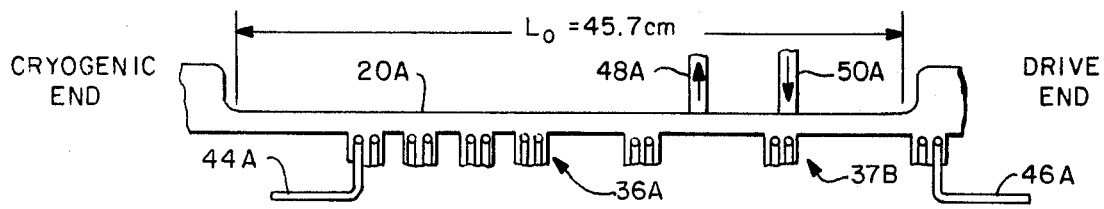
FIG.—3
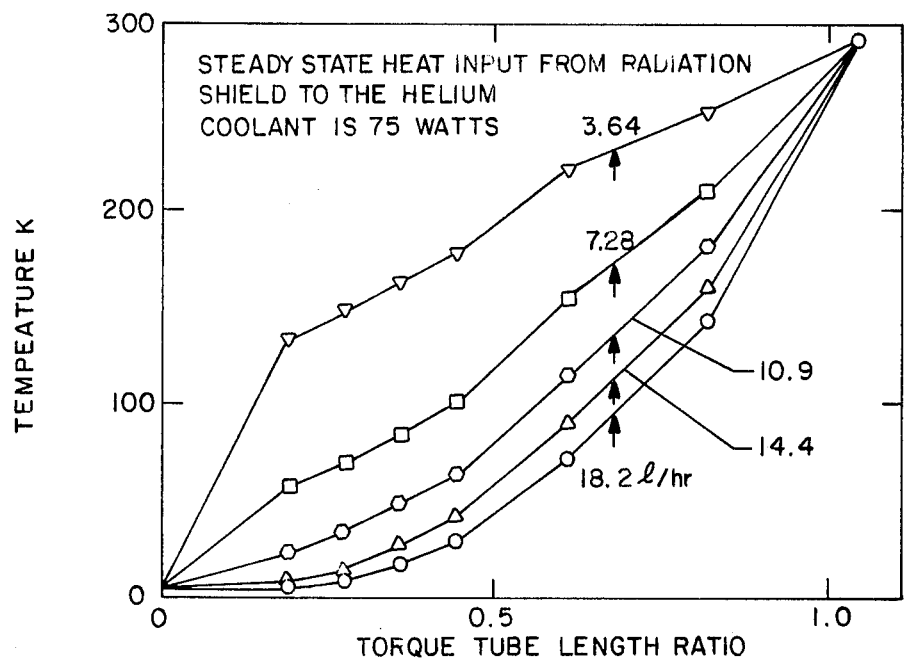
FIG.—4
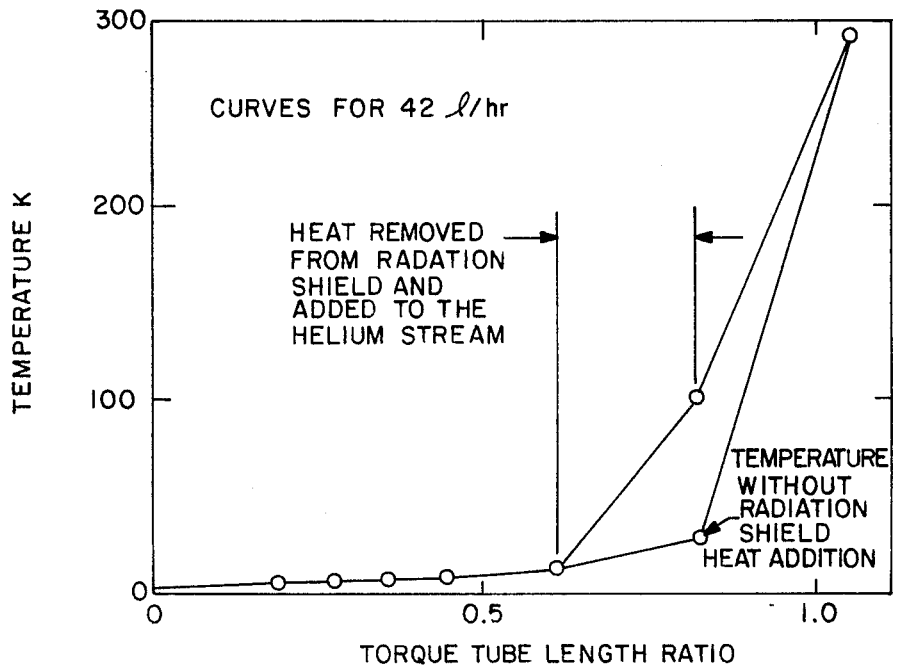
FIG.—5

SUPERCONDUCTING GENERATOR AND METHOD

BACKGROUND OF THE INVENTION

The present invention relates generally to superconducting generators and more particularly to means for and a method of protecting certain components of the generator during particular abnormal conditions.

A typical superconducting generator of the general type to which the present invention is directed includes a number of conventional components. One such component is a supercooled rotor which includes superconducting field windings and a structure for supporting these windings. The rotor is supercooled to a cryogenic temperature by a fluid refrigerant, specifically liquid helium, which is contained within the rotor. Other conventional components of this generator include a pair of torque tubes respectively connected at their ends to opposite ends of the rotor support structure, a torque tube heat exchanger associated with each torque tube and a thermal radiation shield, specifically a cylindrical shield which extends coaxially around the rotor.

During normal operation of the generator, the liquid helium within the rotor is reduced to a gas through boil-off at a relatively low but constant rate. This helium gas is directed to and along the length of each torque tube by its associated heat exchanger. These torque tubes function to transmit torque from the generator driver which is at room temperature to the winding support structure of the rotor which is at liquid helium temperature (about 3.5°–4.2° Kelvin (K). At the same time, they limit thermal stress and cold end heat leakage due to temperature gradients.

The function of the radiation shield is to intercept heat radiation from its ambient surroundings which is typically at room temperature so as to prevent the radiated heat from warming the cryogenic cold zone of the generator, specifically the area surrounding the inner rotor. Thermodynamic considerations have heretofore indicated that a single radiation shield should operate at about 100° K. in order to minimize liquid helium refrigeration costs. However, when one realizes that 100° K. is −280° F., it should be quite apparent that the shield itself must be supercooled. In copending U.S. application patent Ser. No. 905,042, which was filed on May 11, 1978, and assigned to the present Assignee and which is entitled RADIATION SHIELD FOR USE IN A SUPERCONDUCTING GENERATOR OR THE LIKE AND METHOD, a supercooled radiation shield is disclosed. As described in this application, a plurality of passageways are provided internally through the shield and continuous streams of helium gas are applied through these passageways during normal operation of the generator for supercooling the shield internally.

The superconducting generator just recited has been described during normal operation. However, where this type of generator is intended for use in power plant applications, it must be designed to survive the most severe operating condition in such a system, specifically the three phase high voltage transmission line fault. During such a fault, electromagnet losses occur in the field windings comprising part of the supercooled rotor and also in the radiation shield and rotor support structure. This, in turn, causes the liquid helium within in the rotor to boil off at a substantially higher rate which, in turn, causes the flow rate of the helium gas through the torque tube heat exchangers to increase substantially, thereby causing the temperatures of the torque tubes to drop significantly. In fact, it has been predicted that in typical superconducting generators of the general type described above, a helium flow rate would be sufficiently high and the drop in temperatures of the torque tubes would be sufficiently drastic to cause the torque tubes to fracture under these abnormal operating conditions.

One suggested way to prevent fracturing the torque tubes during a fault causing abnormal operation of the type described, is to utilize a flow dividing mechanism for passing the helium stream out of the rotor and directly to an external heat exchanger at the onset of the fault, bypassing the torque tube heat exchangers altogether. While this approach protects the torque tubes during a three phase high voltage transmission line fault, it requires costly and sometimes unreliable flow dividing valves and external heat exchangers. On the other hand, as will be seen hereinafter, the present invention provides a way of protecting the torque tubes utilizing a thermal radiation shield of the type described in the previously recited copending application. As will also been seen, the approach disclosed herein is one which is uncomplicated in design, reliable in use and economical to provide.

OBJECTS AND SUMMARY OF THE INVENTION

One object of the present invention is to provide a superconducting generator which is especially suitable for use in power plant applications, specifically one which is designed to survive a three phase high voltage transmission line fault associated with this type of application.

Another object of the present invention is to provide a superconducting generator which is designed in an uncomplicated, reliable and yet economical way to survive the fault just recited.

Still another object of the present invention is to provide superconducting generator which includes a rotor, interconnected torque tubes and helium for supercooling the rotor and torque tubes and specifically a generator which is designed in an uncomplicated, reliable and economical way to prevent damage to the torque tubes in the event of an abnormally high surge in the flow rate of helium through the generator.

Yet another object of the present invention is to utilize a radiation shield of the general type described in the previously recited copending application for protecting the torque tubes against these abnormal surges of helium.

A further object of the present invention is to provide a method of cooling the torque tubes during normal operation of the generator and during abnormal operation of the type described, particularly an uncomplicated, reliable and economical method which does not require separate flow dividing values.

The superconducting generator disclosed herein, like the typical generator previously recited, utilizes a supercooled rotor including superconducting field windings and support structure and also a pair of torque tubes connected to the winding support structure. However, in accordance with the present invention, these torque tubes must be constructed of a material having a thermal coefficient of linear expansion which is negligible at and below a predetermined cryogenic temperature. In a preferred embodiment, one such material can be selected from the group consisting of steel, nickel and chromium, each of which has a coefficient of linear expansion which is negligible at and below 100° K., actually between 90° K. and 120° K., depending on the materials.

The superconducting generator constructed in accordance with the present invention also includes first means for maintaining predetermined axial sections of the torque tubes at or below the cryogenic temperature recited (100° K. in the preferred embodiment) during normal operation of the generator. This minimizes thermal expansion of the torque tube sections and damage therefrom in the event of abnormal generator operation in a way which causes the sections to drop significantly in temperature, for example during a line fault of the type described previously. The generator also includes second means for maintaining other axial sections of the torque tubes, preferably the remaining sections, at temperatures above the aforerecited cryogenic temperature (100° K. in a preferred embodiment) during normal operation of the generator and for automatically applying heat to these sections from an outside source, thereby minimizing any drop in temperature of these sections in event of a helium surge.

In a preferred embodiment, as will be seen hereinafter, continuous streams of helium gas are directed adjacent to and along the first mentioned torque tube sections utilizing suitable means such as associated torque tubes heat exchangers. These streams of helium gas are thereafter directed through the radiation shield and back to the torque tubes where they flow adjacent to and along the remaining torque tube sections and finally out to the ambient surroundings where they are brought to room temperature. During normal operation of the superconducting generator, the helium gas moves at a predetermined flow rate for maintaining the first torque sections at or below 100° K. At the same time, the helium gas maintains the thermal radiation shield at a cryogenic temperature above that of the first torque tube sections and it also acts as a heat exchanger between the shield and remaining torque tube sections for transferring heat from the shield to these latter torque tube sections. This, in turn, maintains the temperature of these remaining sections at or above that of the shield thereby minimizing any drop in temperature of these remaining torque tube sections in the event a helium surge.

BRIEF DESCRIPTION OF THE DRAWINGS

FIG. 1 is a diametral sectional view of a superconducting generator constructed in accordance with the present invention.

FIG. 2 is a prespective view of a thermal radiation shield comprising part of the generator illustrated in FIG. 1.

FIG. 3 is a schematic illustration of one torque tube and associated torque tube heat exchanger comprising part of the generator illustrated in FIG. 1.

FIG. 4 is a graph illustrating the temperature distribution in degrees Kelvin along the length of the torque tube illustrated in FIG. 2, during normal operation of the generator for a number of different flow rates of helium through the associated torque heat exchanger.

FIG. 5 is graph similar to FIG. 4 but illustrates the temperature distribution of the torque tube during abnormal operation of the generator of the type described previously, for example during a line fault, and only for one of the helium flow rates illustrated in FIG. 4.

DETAILED DESCRIPTION AND PREFERRED EMBODIMENT

Turning now to the drawings, wherein like components are designated by like reference throughout the various figures, attention is directed specifically to FIG. 1 which illustrates a superconducting generator rotor constructed in accordance with the present invention and generally designated by the reference numeral 10. As seen in this figure, the generator includes a cylindrical supercooled rotor 12 which contains superconducting field windings 14 within a cylindrical winding support structure 16. This entire assembly is fixedly connected at its opposite ends to opposite bearing journals generally designated at 18A and 18B by means of two cylindrical torque tubes 20A and 20B. As illustrated, these torque tubes are respectively connected at their ends to opposite ends of the cylindrical support structure 16 and extend coaxially therewith between the support structure and the bearing journals. For reasons to be discussed hereinafter, these torque tubes are constructed of a material having a thermal coefficient of linear expansion which is negligible at and below a predetermined cryogenic temperature. In a preferred embodiment, this material is selected from the group consisting of steel, nickel and chromium, each having a coefficient which is negligible at and below approximately 100° K.

An axially extending feed trough 22 which comprises part of rotor 12 is located concentrically within windings support structure 16. As illustrated in FIG. 1, this trough includes a pair of spaced apart circumferential heat exchangers 24 which extend through the winding support structure and into the field windings. As also illustrated, the trough includes two end walls 26A and 26B for closing off the ends of the trough.

As stated above, rotor 12 is supercooled so that its field windings are superconducting. As seen in FIG. 1, this is accomplished by introducing a fluid refrigerant, specifically liquid helium, into the inner zone of the rotor, that is, the center of axial trough 22 through a suitable conduit 28 which extends through end wall 26A and which branches in a T-shaped manner in directions toward the field windings. The other end of this conduit is connected to a suitable liquid helium source through a conventional rotary transfer system (not shown). As the liquid helium passes into this center zone, it forms an inner concentric pool 30 around the inner surface of the axial feed trough while continuously feeding directly into the windings through the spaces between heat exchangers 24. This pool of liquid helium is a result of the centrifical force to which it is subjected as the rotor rotates during operation of the generator. The liquid helium passes into and cools the windings 14 to its own temperature (about 3.5°–4.2° K.).

The various components of generator 10 just described may be readily provided by those with ordinary skill in the art to which the present invention pertains and hence have not been described in detail. It should be quite apparent that these components are not the only components making up the superconducting generator. Obviously, this generator is comprised of other conventional, readily provided components including for example field leads 32 and 34 and components not shown such as an electromagnetic damper, the previously recited rotating transfer system, an overall generator housing, and means for directly connecting the generator to a three phase high voltage transmission line when the generator is utilized in power plant applications.

In addition to the various components described above and those which have not been described, generator 10 includes a thermal radiation shield and torque tubes heat exchangers associated with each torque tube. These components function in separate independent ways but they also function together as a common system for preventing damage to the torque tubes in the event of a three phase line fault causing abnormal generator operation of the type described previously. More specifically, as will be seen hereinafter, the torque tube heat exchangers which are generally designated at 36A, 37A and 36B, 37B are provided for directing helium gas from the inner zone of rotor 12 adjacent to and along associated torque tubes so that the latter function in conventional ways such as those recited previously. Moreover, the radiation shield, generally designated at 38 and which is cylindrical in configuration, is positioned concentrically around inner rotor 12 and portions of torque tubes 20A and 20B for functioning in a conventional manner, that is, to intercept heat radiation from its ambient surroundings.

However, in accordance with the present invention, as will also be seen hereinafter, these specific components, that is, the torque tube heat exchangers 36 and 37 and the thermal radiation shield 38 are specifically designed to cooperate with each other for protecting the torque tubes against thermal stress during high helium surges by affectively controlling the temperature distribution across each of the torque tubes during normal operation and during this surge period.

As illustrated in FIG. 1, torque tube exchanger 36A is actually a continuous conduit, channel or tubing which extends helically around and against a portion of the inner surface of torque tube 20A from its cryogenic end 40A towards (but stopping short of) its drive end 42A. This helical tubing is interconnected to the inner zone of rotor 12 at its cryogenic end by means of entry conduit 44A. At a predetermined point between the cryogenic end 40A and the drive end 42A, a first bypass tube 48A is provided for connecting the torque tube heat exchanger 36A into shield 38 at one end thereof. The shield is connected at its other end into heat exchanger 37B (located in the position illustrated in FIG. 1) through bypass 50B at a predetermined point along torque tube 20B. The otherwise free end of exchanger 37B is interconnected to the previously recited rotary transfer system by means of an exit tube 46B.

From the foregoing, it should be apparent that the torque tube heat exchangers 36A and 37B are interconnected on opposite ends of shield 38. The torque tube heat exchangers 36B and 37A may be identical to exchangers 36A and 37B, respectively. Accordingly, exchanger 36B is positioned concentrically within and against the internal surface of torque tube 20B from its cryogenic end 40B towards its drive end 42B stopping short of exchanger 37B and is innerconnected to the inner zone of rotor 12 and one end of shield 38 by conduit 44B and bypass 48B, respectively. Exchanger 37A is interconnected to exchanger 36B by the shield at bypass 50A and is also interconnected to the previously recited rotary transfer system by outlet 46A.

During normal operation of generator 10 and, as will be seen, during abnormal operation of the previously described type, helium gas within the inner zone of rotor 12 passes through tubes 44A and 44B and into and through their interconnected torque tube exchangers 36A and 36B and then into and through shield 38 (as will be described) by means of bypass 48A and bypass 48B and back into respective torque tube heat exchangers 37B and 37A through bypasses 50B and 50A and finally to the end of these latter torque tube heat exchangers where it is directed out through outlet conduits 46B and 46A.

Turning specifically to FIG. 2, attention is directed to radiation shield 38. As stated previously, this shield is similar in construction to the shield described in the previously recited copending application. In fact, with one exception to be discussed hereinafter, shield 38 can be identical to the specific shield described in that application and, hence, reference is made thereto. As a result, a detailed description of shield 38 will not be provided herein. It should suffice to state that this shield includes includes a plurality of internal passages 60, preferably axially extending passages, which may be separated into a plurality of circumferentially spaced subgroups, each of which is interconnected by a section 62A and a section 62B of circumferentially extending cross channels located near opposite ends of the shield. Passages 64A and passages 64B extend through the inner surface of the shield in fluid communication with sections 62A and 62B respectively. These passages 64A and 64B are connected with previously described bypass tubes 48A, 50A and 48B, 50B for passing helium gas internally through and in contact with the shield. More specifically, the helium passing into bypass 48A passes through the shield (through one subgroup grooves 60) and out passage 50B. Helium passing into bypass 48B pass through the shield and out bypass 50A (through another subgroup of grooves). Obviously, the helium gas could be passed through still other subgroups of grooves using common manifolds.

As stated above, shield 38, with one exception, may be identical to the specifically described shield in the previously recited copending application. The specific exception relates to the capacity of shield 38 to pass helium gas therethrough at extraordinarily high flow rates and to readily transfer the thermal energy of the shield to the high flow rate streams resulting from a line fault or the like. More specifically, shield 38 has been designed with a scheme of internal passage ways which will readily pass these relatively high surges in helium gas, whereas, in the design of the shield in the copending application, this factor was not taken into account. One skilled in the art would identify the shield of this application as being designed as a high effectiveness regenerator.

Having described superconducting generator 10 including torque tubes 20A and 20B, their associated torque tube heat exchangers and thermal radiation shield 38, attention is now directed to FIG. 3 for a discussion of the temperature distribution across one of these torque tubes, for example torque tube 20A. For purposes of description, the torque tube has been separated into seven stations starting with station No. 1 near the cryogenic end of the torque tube and ending with station No. 7 at the room temperature drive end. As seen in FIG. 3, the cryogenic end of the torque tube heat exchanger 36A, that is, the end connected to connecting conduit 44A, initially makes two very close turns at station No. 1 and thereafter takes successive double turns at spaced apart stations 2, 3, 4 and 5 where it is then interconnected to bypass 48A, actually slightly to the right of station No. 5, where the helium gas is passed into radiation shield 38. However, helium from the shield is passed back into the torque tube heat exchanger 37A at station No. 6 through bypass 50A where the torque tube heat exchanger makes two closely spaced turns and thereafter extends over to station No. 7 where it makes two final turns before it is interconnected to outlet tube 46A.

Several points are worthy to note. First, it should be apparent that there is a specific pattern between the various stations 1 to 7. This pattern along with the flow rate of helium through the exchangers determine the temperature distribution across the torque tube. Second, it should be noted that two closely spaced turns of the torque tube heat exchangers have been provided at each station. It is to be understood that the present invention is not limited to this particular configuration. In fact, each station could include only one such turn or it could include any reasonable and practical number of closely spaced apart isothermal turns (all at the same temperature) depending upon the desired temperature distribution. One final point worthy of noting at this time is that the helium exiting the torque tube heat exchanger 36A through exit tube 48A and entering the shield 38 is not the same helium which enters the torque tube heat exchanger 37A through entry tube 50A from the shield. Rather, as stated previously, the helium entering exchanger 37A at station 6 is the helium which left torque tube heat exchanger 36B at its station 5 (from its bypass 48B). This allows the helium after leaving one torque tube heat exchanger to pass once entirely across the axial length of the shield before returning to the other torque tube heat exchanger. Of course, it could be possible to return the helium to the same station after passing into and through the radiation shield.

As stated previously, one purpose for the helium carrying torque tube heat exchangers and the interconnected thermal radiation shield is to prevent damage to the torque tubes in the event of a surge in helium gas which would cause a significant drop in temperature across the torque tubes. As also stated, this is accomplished by controlling the temperature distribution across the torque tubes. Specifically, as will be seen, predetermined axial sections of the torque tubes are maintained at or below the aforedescribed predetermined cryogenic temperature of the torque tubes, specifically at or below 100° K., during normal operation of the generator. As stated, this minimizes thermal expansion of the sections and damage therefrom in the event of abnormally high surges in helium through the torque tube heat exchangers. At the same time, other sections of the torque tube, specifically the remaining sections, are maintained at a second temperature above the critical cryogenic temperature during normal operation and heat is applied to these sections from an outside source, specifically the radiation shield. In other words, the temperature of these remaining sections are tied to the temperature of the shield which, as will be seen, resists any temperature drop in this section.

In order to more fully explain the temperature distribution just described, attention is directed to the graphs illustrated in FIGS. 4 and 5. Turning specifically to FIG. 4 the temperature distribution in degrees Kelvin across the length of torque tube 20A have been plotted for five different flow rates of helium gas through the torque tube heat exchanger, based on a steady state heat input from the radiation shield 38 to the helium of 75 Watts. It should be quite apparent from these different curves that the temperature distribution across the torque tube is effected in a significant way by the particular helium flow rate. For example, at station 1, the temperature of the torque tube for a flow rate of 3.64 liters per hour (l/hr) is approximately 130° K., whereas a flow rate of 14.6 l/hr and 18.2 l/hr provide a substantially lower temperature at station No. 1, specifically about zero degrees K.

In accordance with the preferred embodiment of the present invention, torque tubes 20A and 20B are constructed of material selected from the group consisting of steel, nickel and chromium. As stated previously, these materials have a thermal coefficient of linear expansion which is negligible at a temperature at or below approximately 100° K. In comparing the various distribution curves illustrated in FIG. 4 with torque tube 20A illustrated in FIG. 3, it can be seen that the distribution curve for a flow rate of 3.64 l/hr is clearly outside the requirements of the present invention. Specifically, not one of the stations across the length of the torque tube is at or below 100° K. In the next curve, that is, the one resulting from a flow rate of 7.28 l/hr, while stations 1 through 4 are at or below 100° K., stations 5 to 7 are not. While station Nos. 6 and 7 are in fact not to be maintained below 100° K. because these stations (sections) are tied to the thermal radiation shield, station No. 5 is not. Accordingly, if this latter station is not maintained at or below approximately 100° K. it will expand significantly if subjected to a significant drop in temperature. Accordingly, the distribution curve represented by the 7.28 l/hr flow rate does not meet the requirements of the present invention.

It should however be clear that the remaining three curves do meet the requirements of the present invention. Specifically, from FIG. 4 it can be seen that, during normal operation of the generator, all of the stations 1 to 5, that is, the sections of the torque tube from its cryogenic end to exchanger 37A are maintained at or below 100° K. In this regard, the curve represented by the 10.9 l/hr flow rate may be questionable in that the point between the exchangers 36A and 37A (indicated by the arrow) is slightly above 100° K. whereas these points in the last two curves are clearly at or below 100° K.

From the point where the helium gas is bypassed into the shield to the point where it returns to the shield, the temperature rises somewhat, actually reaching the temperature of the shield in the vicinity of station No. 6, that is, the point of entry of the helium from the shield. From this general vicinity all the way to the drive end of the torque tube its temperature rises.

As stated previously, the various temperature distribution curves just described represent the temperature across torque tubes 20A and 20B during normal operation of generator 10. However, during a three phase high voltage transmission line fault, or for any other reason should the helium flow rate increase drastically, there is a tendency for a significant drop in temperature across the torque tubes, especially if not controlled. Turning specifically to FIG. 5, a temperature distribution curve during this abnormal operation is illustrated. The rate of change of temperature with axial distance between stations 6 and 7 of this curve compares favorably to the 18.2 l/hr flow rate referred to previously and represents a satisfactory thermal stress level. However, during this abnormal operation, it can be seen that the torque tube from its cryogenic end to station No. 5 has dropped significantly in temperature. However, because this section was initially maintained at temperatures at or below 100° K. the drop in temperature did not subject it to any appreciable thermal stress. On the other hand, it can be seen that the section between station No. 5 and station No. 7 did not drop significantly in temperature. This is because of the transfer of heat to this section from the radiation shield by means of helium gas. In other words, even though the increase in helium flow rate through the radiation shield and exchanger 37A between stations 5 and 7 has a tendency to decrease the temperature of the shield and corresponding torque tube section, the shield acts as a relatively large heat source and will not drop in temperature significantly. Moreover, where the abnormal operation is a result of a line fault of the aforedescribed type, the electromagnetic field resulting from such a fault will actually heat the shield to a temperature higher than its normal temperature, thereby contributing even more heat to the helium gas.

From the foregoing, it should be apparent that the present invention is based upon a particular temperature distribution across the torque tubes. It is to be understood that one with ordinary skill in the art, based on the teachings disclosed herein could readily determine a particular helium flow rate and torque tube heat exchanger configuration necessary to provide the appropriate temperature distribution necessary to meet the requirements set forth herein. Of course, this is true for both torque tubes.

Having described generator 10 and the manner in which it operates, both normally and abnormally, attention is directed to a specific example. In this example, the rotor design is one which has a normal helium flow rate of 10.9 liters per hour, as illustrated in FIG. 4. For this rotor, a 66 microsecond line fault causes a heat input of 21 K joules which boils off approximately 3.8 liters of helium per end (per torque tube). The resulting helium flow rate rises to 456 liters per hour per end for 30 seconds. Analysis shows that the thermal stress reaches the design limit at approximately 20 liters per hour per end for the design being considered. The heat capacity of the fault induced helium stream is 4.9 KJ/°K. and the torque tube capacity, by comparison is negligible. However, the heat capacity of the radiation shield for the present design is 46 KJ/°K. If the heat content of the shield is fully available to the helium stream, the stream could be raised approximately 100° K. for a 10° K. temperature drop in the shield. Because heat must be conducted to the cooling passages in the radiation shield and a temperature drop exists in the helium at the duct wall, all of the heat content at the shield is not available to the helium. However, application of the usual periodic heat exchanger equations to the shield indicates a thermal approach of about 15° K. Adding this temperature to a 5° K. drop in shield temperature indicates that the helium will return to the torque tube at station 6 at about 100° K. if the radiation shield normally operates at 120° K. average temperature. Note that so far the analysis have not accounted for electromagnetic heating of a radiation shield during the 66 microsecond fault. During the fault, 5KJ of energy is generated in the radiation shield which tends to aid in the helium warming function, if only slightly. FIG. 4 shows the torque tube temperature distribution to be similar to the steady state distribution above 100° K. but radically altered below 100° K. The steep gradients below 100° K. result in very little stress because the coefficient of linear expansion of steel, nickel and chromium are minuscule below a 100° K. as stated previously. Thus, the novel torque tube exchanger and radiation shield cooling methodology protects the torque tube from extreme thermal stresses. Moreover, the preheated helium when passing through the rotary transfer system upon exiting the generator protects the system's seals which cannot operate below 280° K.

What is claimed is:

1. A superconducting generator comprising:
   (a) a rotor assembly adapted to be super cooled, said assembly including
     (i) superconducting field windings,
     (ii) cylindrical means for supporting said windings, and
     (iii) housing means within said cylindrical means adapted for containing liquid helium therein:
   (b) first and second cylindrical torque tubes respectively connected at their ends to opposite ends of said cylindrical means and extending coaxial therewith, said torque tubes each being constructed of a material having a coefficient of linear thermal expansion which is negligible at and below 100° K., said material being selected from the group consisting of steel, nickel and chromium;
   (c) a cylindrical thermal radiation shield mounted concentrically around and spaced outwardly of said rotor assembly, said shield including passage means adapted to pass helium gas internally through and in direct contact with said shield; and
   (d) a cryogenic cooling arrangement for
     (i) supercooling said rotor assembly during normal operation of said generator,
     (ii) maintining predetermined axial sections of said torque tubes at temperatures at or below 100° K. during said normal operation, whereby to minimize thermal expansion of said sections and damage therefrom in the event said generator operates in an abnormal way so as to cause said sections to drop significantly in temperature,
     (iii) maintaining said shield at a temperature at or above 100° K. during said normal operation, and
     (iv) maintaining the remaining sections of said torque tubes at a temperature approximately at or above the temperature of said shield at any given time during said normal operation and also during said abnormal operation;
   (e) said cryogenic cooling arrangement including
     (i) a source of liquid helium within said rotor assembly housing means, some of said liquid helium being reduced to gas during said normal operation for providing a source of helium gas therein,
     (ii) means for directing continuous streams of said helium gas adjacent to and along said predetermined torque tube sections at a predetermined flow rate to maintain said predetermined sections at or below 100° K.,
     (iii) means for directing said streams of helium gas from said predetermined sections through said passage means in said shield for maintaining said shield at or above 100° K. during said normal operation, and for directing said streams through said passage means during said abnormal operation, and
     (iv) means for directing said streams from said shield adjacent to and along said remaining torque tube sections during said normal operation and during said abnormal operation for maintaining said remaining sections at a temperature approximately at or above that of the shield.

2. A superconducting generator, comprising:
(a) a rotor assembly adapted to be super cooled, said assembly including
   (i) superconducting field windings, and
   (ii) cylindrical means for supporting said windings;
(b) first and second cylindrical torque tubes respectively connected at their ends to opposite ends of said cylindrical supporting means and extending coaxial therewith, said torque tubes each being constructed of a material having a thermal coefficient of linear expansion which is negligible at and below a predetermined cryogenic temperature;
(c) means for super cooling said rotor assembly during normal operation of said generator;
(d) a thermal radiation shield adjacent to and outside said rotor assembly, said shield including internal passage means adapted to pass helium gas therethrough;
(e) a source of helium gas;
(f) first means for directing continuous streams of said helium gas at a predetermined flow rate adjacent to predetermined first axial sections of said torque tubes for maintaining the temperature of said sections at or below said predetermined cryogenic temperature during said normal operation, whereby to minimize thermal expansion of said first sections and damage therefrom in the event said generator operates in an abnormal way so as to cause said sections to drop significantly in temperature;
(g) second means for directing said streams of helium gas from said first torque tube sections to and through said passage means in internal contact with said shield for maintaining said shield at a cryogenic temperature at or above said predetermined cryogenic temperature;
(h) third means for directing said streams of helium gas from said shield to predetermined second axial sections of said torque tubes for transferring heat from said shield to said second sections for maintaining said second sections at temperatures at or above said predetermined cryogenic temperatures during said normal operation, said transfer of heat minimizing any drop in temperature of said second torque tube sections in the event of said abnormal operation.

* * * * *